(12) United States Patent
Singh et al.

(10) Patent No.: US 9,710,579 B1
(45) Date of Patent: Jul. 18, 2017

(54) USING SMART TIMING MODELS FOR GATE LEVEL TIMING SIMULATION

(71) Applicant: Cadence Design Systems, Inc., San Jose, CA (US)

(72) Inventors: Gagandeep Singh, New Delhi (IN); Pawan Deep Gandhi, Haryana (IN)

(73) Assignee: Cadence Design Systems, Inc., San Jose, CA (US)

( * ) Notice: Subject to any disclaimer, the term of this patent is extended or adjusted under 35 U.S.C. 154(b) by 813 days.

(21) Appl. No.: 14/094,393

(22) Filed: Dec. 2, 2013

(51) Int. Cl.
*G06F 17/50* (2006.01)

(52) U.S. Cl.
CPC ................................ *G06F 17/5031* (2013.01)

(58) Field of Classification Search
USPC .................. 703/2, 14; 716/107, 108, 113
See application file for complete search history.

(56) References Cited

U.S. PATENT DOCUMENTS

| | | | | |
|---|---|---|---|---|
| 5,191,541 A * | 3/1993 | Landman | ............ | G06F 17/5031 716/108 |
| 5,384,720 A * | 1/1995 | Ku | ............ | G06F 17/5022 703/16 |
| 5,550,839 A * | 8/1996 | Buch | ............ | G01R 31/318519 706/921 |
| 5,644,498 A * | 7/1997 | Joly | ............ | G06F 17/5031 716/103 |
| 6,028,993 A * | 2/2000 | Yu | ............ | G06F 17/5027 703/13 |
| 6,662,349 B2 * | 12/2003 | Morgan | ............ | G06F 17/5068 716/114 |
| 7,039,887 B2 | 5/2006 | Khalil et al. | | |
| 7,555,689 B2 * | 6/2009 | Goswami | ............ | G01R 31/318547 703/13 |
| 7,941,774 B2 | 5/2011 | Luan et al. | | |
| 7,984,354 B2 * | 7/2011 | Goswami | ............ | G01R 31/318547 703/13 |
| 8,607,176 B2 * | 12/2013 | Soreff | ............ | G06F 17/5031 716/108 |
| 2009/0150103 A1 * | 6/2009 | Ellavsky | ............ | G01R 31/318357 702/79 |
| 2009/0327986 A1 * | 12/2009 | Goswami | ............ | G01R 31/318547 716/108 |

OTHER PUBLICATIONS

Gagandeep Singh & Amit Dua, "Gate-Level Simulation Methodology," Jan. 2013, 26 pages.

* cited by examiner

*Primary Examiner* — Thai Phan
(74) *Attorney, Agent, or Firm* — Andrews Kurth Kenyon LLP (57) ABSTRACT

A system and method for simulating the timing of an integrated circuit design using abstract timing models. An abstract or smart timing model is created as a model of a design component or block having partial timing that includes the timing for the boundary or interface logic but removes timing for internal registers. The smart timing model may additionally preserve the timing for asynchronous or multi-cycle paths, or add interconnect delays for certain internal elements, to ensure accurate timing.

20 Claims, 8 Drawing Sheets

USING SMART TIMING MODELS FOR GATE LEVEL TIMING SIMULATION

BACKGROUND

Aspects of the present invention relate generally to the field of system development and test, and more specifically to gate level simulation of electronics.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are often performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using register transition level (RTL) analysis or gate level simulation (GLS).

A number of gate level simulation (GLS) applications are in demand, including design for test (DFT) and low-power considerations. GLS is costly in time and resources and even more expensive for the GLS with timing. For larger designs, gate level simulation often requires additional cycles such that the increase in design sizes and the complexity of timing checks often lead to much longer run times and high memory requirements. However, currently there is no way to smartly, selectively enable or disable the timing for GLS for high performance and complete accuracy.

Accordingly, there is a need in the art to improve the efficiency of gate level simulations for complex designs while maintaining accurate timing results.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A smart timing model is an abstract model of a design component or block having partial timing that includes the timing for the boundary or interface logic but removes most of the internal register-to-register timing. The model additionally preserves the timing for asynchronous or multi-cycle paths in specific cases, to ensure correct functionality and accurate timing. The timing model additionally preserves the clock timing information of the clocks driving the interface circuit, including clock sources that are external or internal to an IP component. Using a smart timing model in conjunction with static timing analysis and gate level simulation will ensure that the timing of the modeled block is accurate at the output and that timing checks are enabled at the inputs. Testing a design using smart timing models as described herein can result in performance and resource utilization improvement for both static timing analysis and gate level simulation. The smart timing models are scalable and therefore effective regardless of the size of the component.

Figure 1:
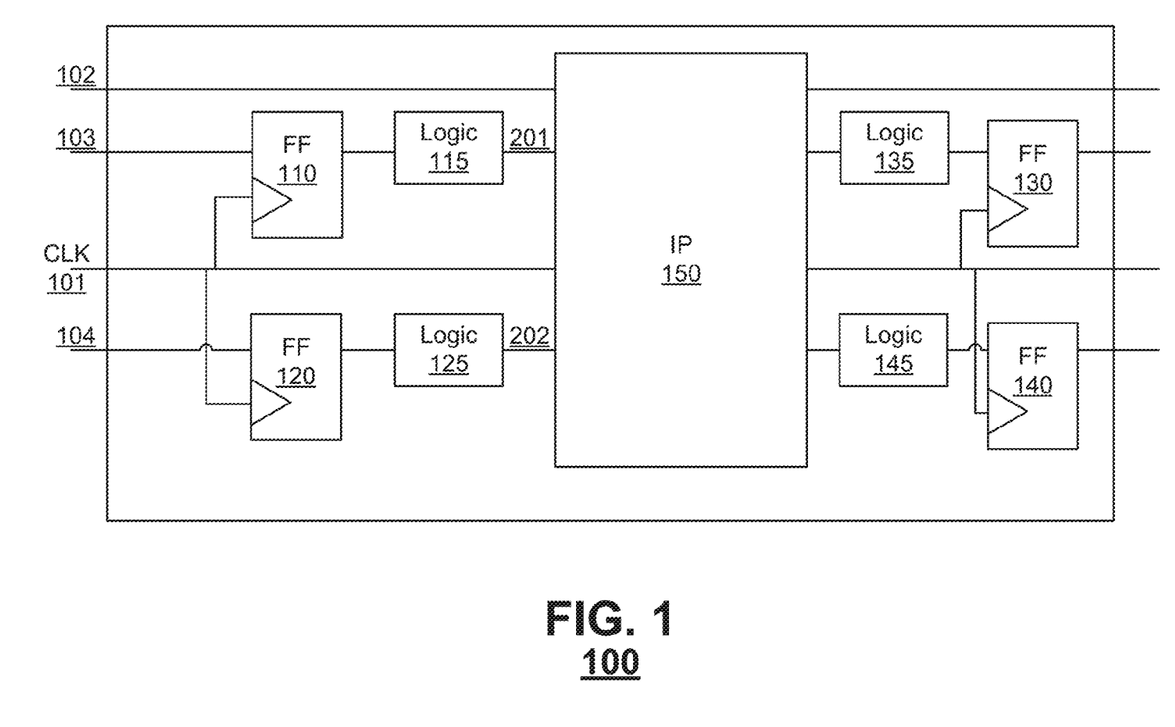
FIG. 1 is a simplified block diagram illustrating an exemplary hardware design that can be tested according to an embodiment of the present invention.

FIG. 1 is a simplified block diagram illustrating an exemplary hardware design 100 that can be tested according to an embodiment of the present invention. The hardware design 100 may be implemented as part of a larger system on a chip (SOC) design that may in turn be implemented in a device such as a mobile phone (including but not limited to a smartphone), a tablet, or a computer of some kind. SOC designs often include one or more IP design components. For example an SOC could include multiple IP design components such as memory (static or dynamic, general-purpose or special-purpose); graphics processing; audio; video; power management; various wired communication and/or bus protocols including but not limited to PCI Express, members of the PCI Express family, and/or variants thereof, in different applications depending on the data communications need; wireless communications protocols including but not limited to cellular (e.g. GSM/CDMA), Wi-Fi, WIMAX; various connection protocols including but not limited to different forms of USB (different versions, micro-USB, mini-USB, and the like), video connection protocols (e.g. Thunderbolt (which might be one example of a PCI Express application), HDMI, or others) or other connector types which may or may not be proprietary; and/or image processing (e.g. on-board camera functionality). All of these various elements could be provided in a single design incorporating IP from multiple providers, or multiple types of IP from a single provider, or could be contained in multiple designs.

As shown in FIG. 1, a design 100 may include a plurality of flip-flops 110, 120, 130, and 140 connected via a plurality of connections and other logic elements 115, 125, 135, 145. A clock signal 101 and other input signals 102, 103, 104 may be input into the design 100. The logic elements 115, 125, 135, 145 may be any collection of combinational logic elements. For example, a logic element may include one or more transistors, resistors, gates, and/or switches to implement some functionality in the design. For the purposes of this description, the individual elements making up the logic elements 115, 125, 135, 145 are not material.

The exemplary design 100 additionally contains an IP component 150. The IP component 150 may be a third party IP or a portion of the design that is re-used across different SOCs and is already silicon proven or has verified timing. Hardware designers do not always design every component of a new hardware device. While designers may design one or more components of a particular device, they often employ component designs (also known as intellectual property, or IP) from one or more third-party IP providers. Using components from third-party IP providers can facilitate efficient creation of the design by avoiding the need for the designer to create every aspect of the device's functionality.

According to an embodiment of the present invention, to implement the gate level simulation (GLS) for the design 100, the timing of the IP component 150 may then be adjusted to identify elements that are already proven and that do not contribute to the overall timing accuracy of the design 100. Then removing the internal register-to-register timing of the elements present in the component 150 and may have little effect on the accuracy of the GLS timing results for the design 150. However, the timing of the elements in the component that interface with the remainder of the design as well as any elements identified in asynchronous paths or multi-cycle paths should be preserved to ensure that the timing is accurate.

Figure 2:
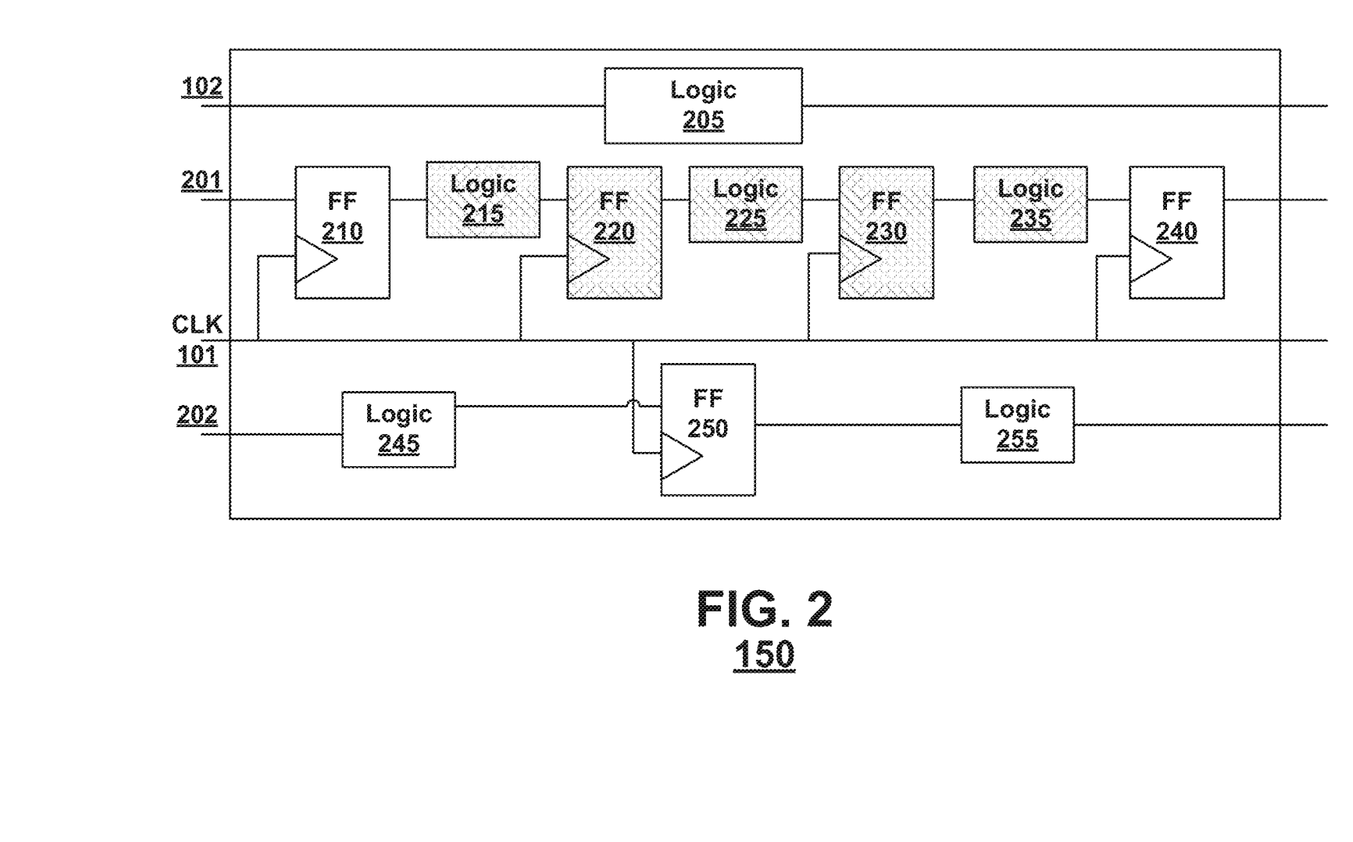
FIG. 2 is a simplified block diagram that illustrates an exemplary component of a design according to an embodiment of the present invention.

FIG. 2 is a simplified block diagram that illustrates an exemplary IP component 150 according to an embodiment of the present invention. For the purposes of GLS testing, the component 150 may be replaced with a smart timing model. As shown in FIG. 2, the component may consist of multiple flip-flops 210, 220, 230, 240, and 250 and logic elements 205, 215, 225, 235, 245, and 255 connected via a plurality of connections. A clock signal 101 and other input signals 102, 201, and 202 may be input into the component 150.

A smart timing model may be created to replace the component 150 during gate level simulation. As previously noted, a smart timing model is a partial timing model of the component 150 that includes timing for the boundary logic but removes most of the internal register-to-register timing. The internal elements of the component 150 are shown as shaded. It also internally identifies asynchronous paths and multi-cycle paths and preserves their timing to ensure correct functionality and accurate timing during GLS. As shown in FIG. 2, the smart timing model of the component 150 will remove or otherwise set the delay to zero for internal flip-flops 220 and 230 and for logic elements 215, 225, and 235. Using the abstract timing provided by the smart timing model, GLS will ensure that the timing is accurate at the output of the component 150.

Figure 3:
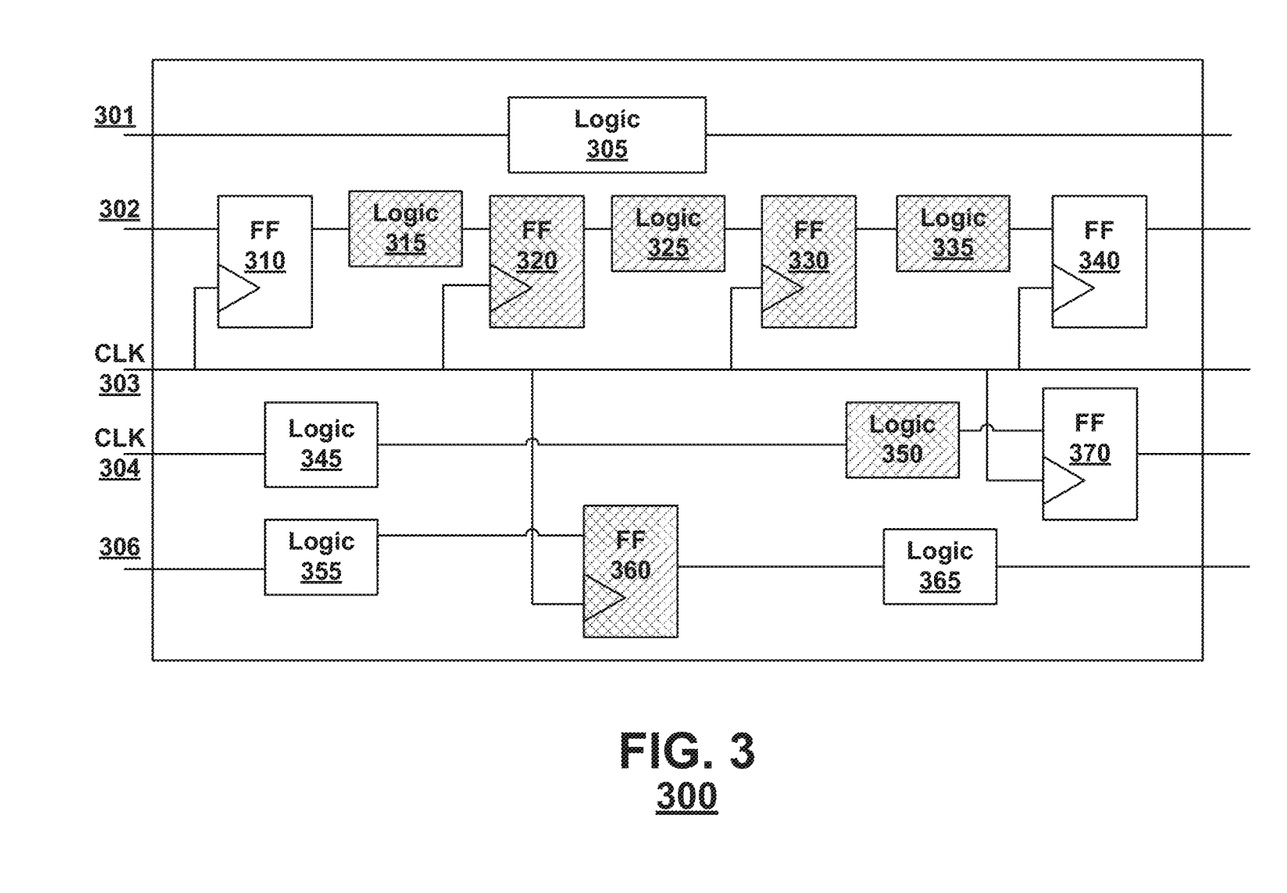
FIG. 3 is a simplified block diagram that illustrates an exemplary component of a design according to an embodiment of the present invention.

FIG. 3 is a simplified block diagram that illustrates an exemplary component 300 of a design according to an embodiment of the present invention. As shown in FIG. 3, the component 300 may consist of multiple flip-flops 310, 320, 330, 340, 360, and 370 and logic elements 305, 315, 325, 335, 345, 350, 355 and 365 connected via a plurality of connections. A clock signal 303 and other input signals 301, 302, 304, and 305 may be input into the component 300. As previously noted, the internal elements are denoted by the shading, thus logic elements 315, 325, 335, and 350 and flop-flops 320 and 330 are internal elements that may have a delay set to zero in order to run the GLS with a smart timing model according to an embodiment of the present invention.

Figure 4:
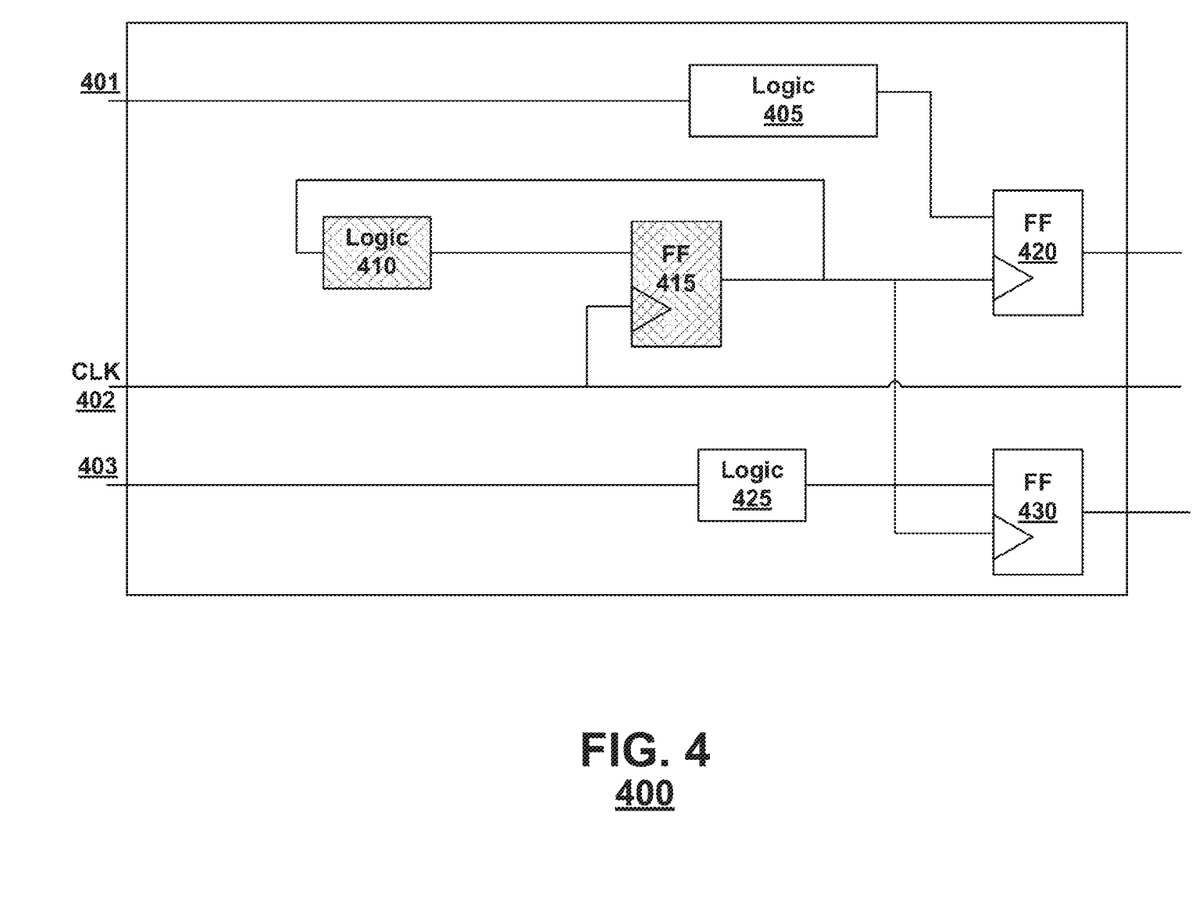
FIG. 4 is a simplified block diagram that illustrates an exemplary component of a design according to an embodiment of the present invention.

FIG. 4 is a simplified block diagram that illustrates an exemplary component 400 of a design according to an embodiment of the present invention. As shown in FIG. 4, the component 400 may consist of multiple flip-flops 415, 420, and 430 and logic elements 405, 410, and 425 connected via a plurality of connections. A clock signal 402 and other input signals 401 and 403 may be input into the component 400. As previously noted, the elements that are considered internal are denoted with shading. However, although logic element 410 and flip-flop 415 are internal elements, setting the delay for these components where a clock value is generated internally with a zero delay combinational loop will cause the simulation to hang. Therefore, the timing of such elements needs to be preserved in order to ensure the clock signal is generated correctly. Thus elements 410 and 415 will have their timing preserved in a smart timing model for the component 400.

Figure 5:
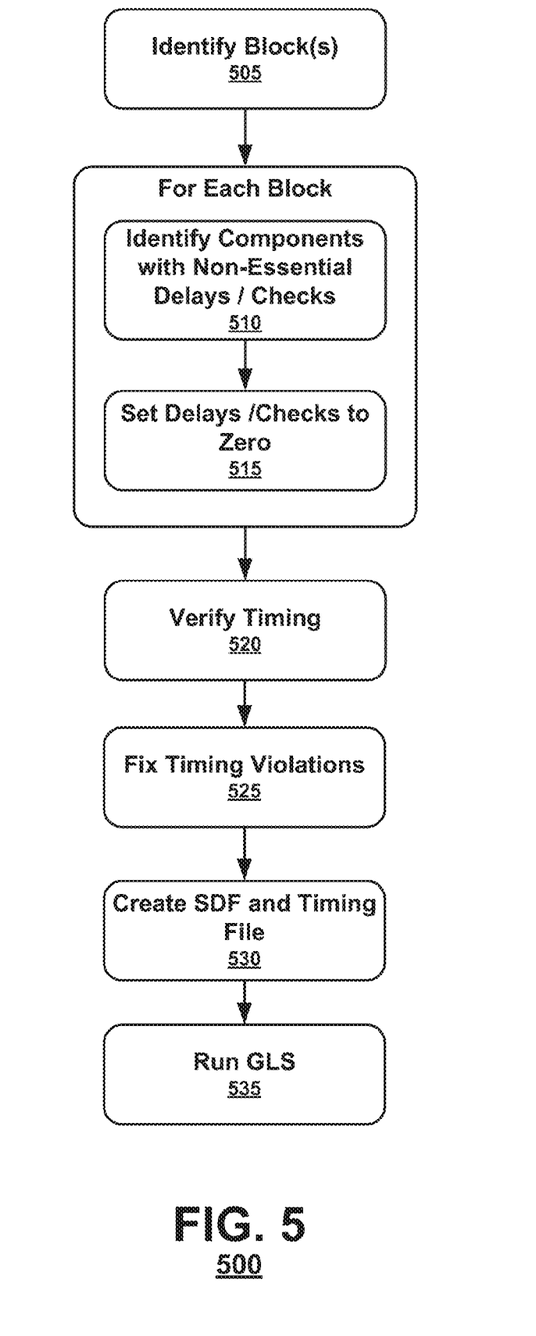
FIG. 5 is a simplified flow diagram that illustrates a method for gate level simulation according to an embodiment of the present invention.

FIG. 5 is a simplified flow diagram that illustrates a method 500 for gate level simulation according to an embodiment of the present invention. Preliminarily, a timing analysis tool may receive or otherwise read a netlist for the complete design, for example, for an SOC design. Then a list of blocks or components are identified that will be considered for timing abstraction (block 505). As previously noted, such blocks may include third party IP components or other blocks that are already silicon proven, have a verified timing accuracy, and may be re-used across different SOCs. Then within the blocks identified for consideration, the components for which the internal timing delays are non-essential for proper timing analysis are identified (block 510). Components having non-essential timing delays may include the gates or cells that do not contribute to the timing concerns of the design i.e. internal gates and flops.

For each identified component with non-essential delays, the timing analysis tool internally sets the delay to zero (block 515). For these non-essential gates, the timing may be completely switched off. For other portions of the design, such as points of integration between the block and the remainder of the design, that may raise timing concerns, the timing analysis tool preserves the timing of affected elements.

Once the timing on the identified blocks has been adjusted, the timing analysis tool may then run a complete static timing analysis (STA) to identify and fix timing violations, if any (block 520). During STA, the timing analysis tool may identify hold violations, combinational loops, asynchronous paths, multi-cycle paths, logic in the clock path for the smart timing model, and other errors and correcting the identified errors by preserving the timing of those elements or adding interconnect delays as appropriate. According to an aspect of an embodiment, certain errors may be identified by running a script on the smart timing models. Other errors not described herein may additionally be detected and corrected.

To identify and fix timing violations, the timing analysis tool may verify the timing of the design to identify any side effects or other potential timing errors that may arise as a result of replacing the identified blocks with the smart timing model. According to an aspect of an embodiment, the timing analysis tool may initially identify areas of the design for which a smart timing model is utilized and the timing of the components that may have been affected or changed. Then only those identified areas may be analyzed to identify violations or errors.

For example, the timing analysis tool may determine whether a race condition will occur. In some instances, setting the delay for all the internal gates in a component to zero will result in marginal differences in timing when there is logic in a clock path. Specifically, removing the timing for an element within a block may create errors in the GLS such that the timing of the smart timing model will never exactly match the full timing results. However, as the delay for other internal logic elements for the block may additionally be set to zero, preserving the timing of the gates within the clock path would lead to race conditions, for example, causing the flops to latch on the wrong clock edge. Therefore, preserving the timing for the identified element would result in an error, and setting the delay for the identified element to zero will result in inaccurate timing results. To correct for the detected potential race error, an interconnect delay may be added to an appropriate affected element for example, an interconnect delay may be added at the input of an appropriate flop such that the delay will cause the flop to latch at the correct clock edge. Referring again to FIG. 3, an exemplary race error may occur if the timing for logic element 350 is set to zero. The error may be fixed by adding an interconnect delay to the input of flop 370.

Additionally, the timing analysis tool may determine whether a hold violation will occur. For example, in some instances, setting the delay for all the internal gates in a component to zero will result in hold violations with respect to certain shared resources. To correct for such errors induced by changing the timing of the elements, an interconnect delay may be added in the data path of the smart timing model as required to fix the hold violations. Therefore the identified errors may be corrected by adding interconnect delays between elements.

Or the timing analysis tool may determine whether an internally generated clock is affected. As previously noted with reference to FIG. 4, in some instances, setting the delay for internal components where a clock value is generated internally with a zero delay combinational loop will cause a simulation to hang. Therefore, the timing of such elements needs to be preserved in order to ensure the clock signal is generated correctly. To correct for such errors induced by changing the timing of the elements, certain internal elements may have timing delays reinstated.

Looking back at FIG. 5, once the errors induced by the use of the smart timing models are resolved, the timing analysis tool may generate a Standard Delay Format (SDF) file and a timing file for use in the gate level simulation (block 530). During simulation a simulator tool may ensure that the timing for non-essential cells is switched off based on the generated SDF and timing files. Then the gate level simulation may be executed (block 535). The simulation with internal gates of some components having a timing delay set to zero will have the same timing accuracy as a simulation executed with the full timing at the ports of the IP components.

Figure 6A:
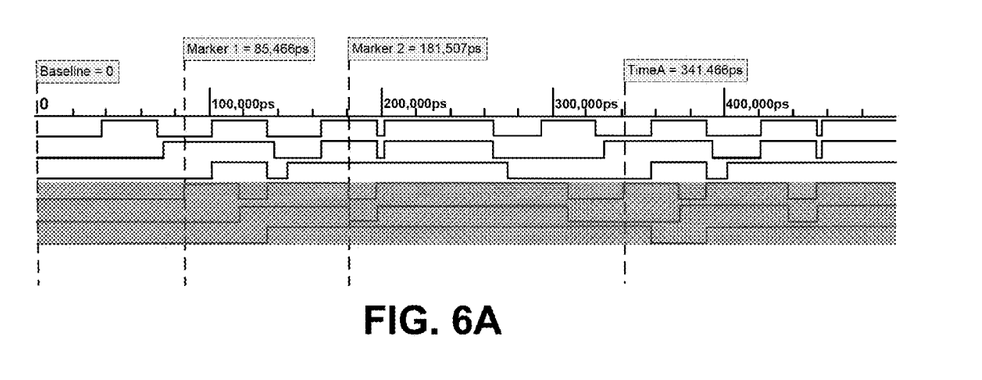
FIG. 6(A) illustrates the full timing during gate level simulation of a design.
Figure 6B:
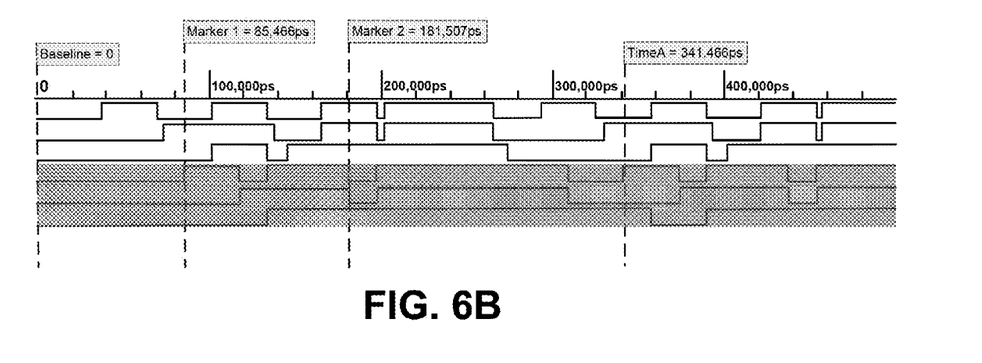
FIG. 6(B) illustrates the accuracy of gate level simulation timing using smart timing models according to an embodiment of the present invention.

FIGS. 6(A) and 6(B) illustrate the timing accuracy of the GLS using smart timing models according to an embodiment of the present invention. FIG. 6(A) illustrates the full timing of an exemplary design. FIG. 6(B) illustrates the timing of the same exemplary design using smart timing models according to an embodiment of the present invention. As shown in FIGS. 6(A) and 6(B), the timing of the design using a smart timing model is the same as the full timing results tested according to conventional methods at the ports of the IP components.

Figure 7:
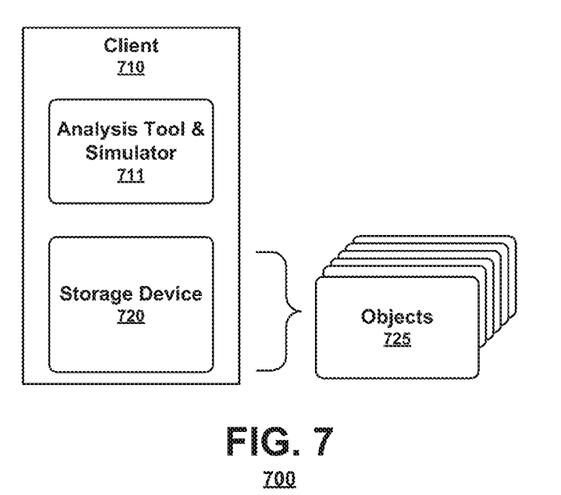
FIG. 7 is a simple block diagram illustrating components of an exemplary system according to an embodiment of the present invention.

A user may access a timing analysis tool and simulator interface to test a design in a standalone client system, client-server environment, or a networked environment. FIG. 7 is a simple block diagram illustrating components of an exemplary system 700 according to an embodiment. As shown in FIG. 7, a system 700 may comprise a client 710 executing a timing analysis tool and a simulator 711 and having a memory storage 720. The client 710 may be any computing system that executes a timing analysis tool and a simulator 711 or otherwise facilitates access to memory storage 720, for example a personal computer. The client 710 may include a processor that performs a method in accordance with the disclosed embodiments. Such a client would be part of an overall test system in accordance with the disclosed embodiments.

Hardware models, instruction sets, software packages, instances of the modeled components, state information for the modeled components, timing files, netlists and other objects 725 used by the timing analysis tool and simulator 711 may be stored in memory storage 720. A user may access the objects 725 stored in memory storage 720 with the client 710 via the an timing analysis tool and simulator 711, where the timing analysis tool and simulator 711 is capable of accessing memory storage 720 and displaying the objects 725 and the data associated with the static timing analysis and simulation. The timing analysis tool and simulator 711 may include a user interface, for example a program, application or middleware that acts as a frontend to and facilitates access to objects in memory storage 720. The timing analysis tool and simulator 711 may facilitate executing a gate level simulation with smart timing models using the tools and procedures described herein. The user may interact with the timing analysis tool and simulator 711 through a number of input devices, such as by inputting a selection as with a mouse or inputting a request as with a keyboard. The user may observe the test results on an output device or display. The timing analysis tool and simulator 711 may run in an application window controlled by the user.

As shown in FIG. 7, a client 710 may be a stand-alone system, as may be of particular interest where the components being tested are highly confidential. Additionally, according to an aspect of an embodiment as shown in FIG. 8, a client 810 may be part of a networked environment.

Figure 8:
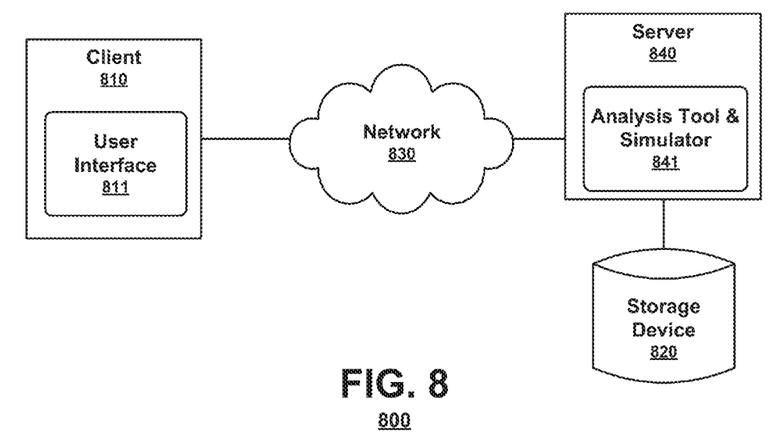
FIG. 8 is a simple block diagram illustrating components of an exemplary system according to an embodiment of the present invention.

FIG. 8 is a simple block diagram illustrating components of an exemplary system 800 according to an embodiment. As shown in FIG. 8, system 800 may include a client 810 having a user interface 811. The client 810 may be connected to a server 840 via a network 830. The timing analysis tool and simulator 841, which in this embodiment is located at server 840, may have access to storage device 820 storing hardware models, instruction sets, software packages, instances of the modeled components, state information for the modeled components, timing files, netlists and other objects utilized by the timing analysis tool and simulator 841. The server 840 may include a processor that performs a method in accordance with the disclosed embodiments. Such a server then would be part of an overall test system in accordance with the disclosed embodiments.

A user may access an timing analysis tool and a simulator 841 at the server 840 via the client 810 having a user interface 811 capable of accessing and displaying the components implemented as part of a virtual platform and the results of the analysis of those components. The client 810 may be any computing system that facilitates the user accessing storage device 820, for example a personal computer. The network 830 may be a wired or wireless network that may include a local area network (LAN), a wireless area network (WAN), the Internet, or any other network available for accessing storage device 820 from the client 810.

The server 840 may be a network server accessible to the client 810 via the network 830 that may manage access to storage device 820. The user interface 811 may receive instructions regarding an analysis and simulation from the user and utilizing the objects stored in memory storage 820, facilitate a display of the information gathered during the test. Multiple different clients (not shown) may access storage device 820 via the network 830 and request access to the objects stored therein.

In another networked environment, the timing analysis tool and simulator may be executed on a network capable client and access the models, packages and other objects stored in one or more storage devices via a network and communications server.

Figure 9:
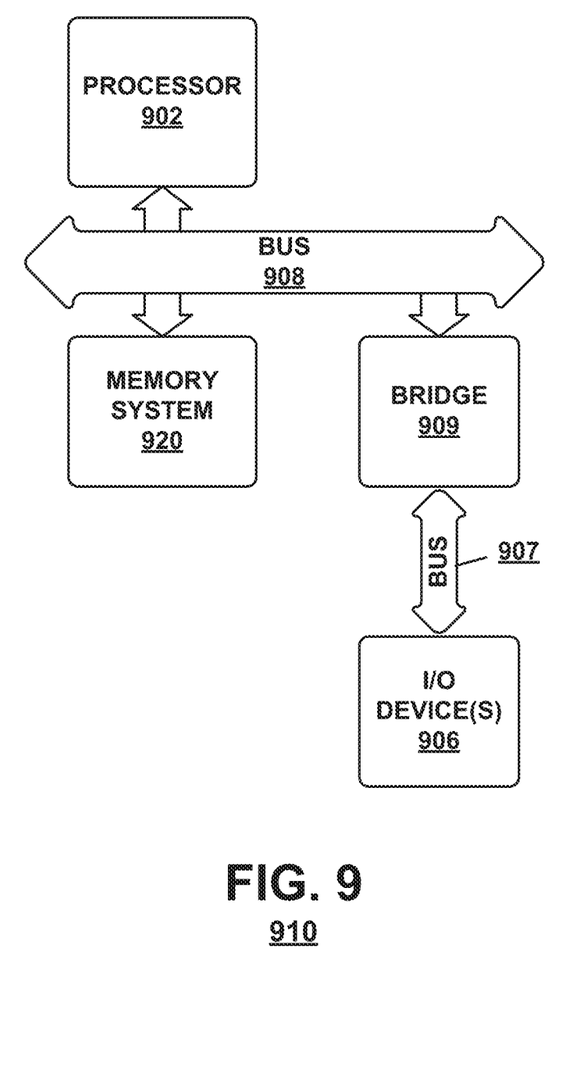
FIG. 9 is a simple block diagram illustrating components of an exemplary client according to an embodiment of the present invention.

FIG. 9 is a simple block diagram illustrating components of an exemplary client 910 according to an embodiment of the present invention. As shown in FIG. 9, the client 910 configured to execute the timing analysis tool and simulator as described herein may include a processor 902, a memory system 920 and one or more input/output (I/O) devices 906 in communication. The communication can be implemented in a variety of ways and may include one or more computer buses 907, 908 and/or bridge devices 909 as shown in FIG. 9. The I/O devices 906 can include network adapters and/or mass storage devices from which the client 910 can receive commands for executing the analysis and simulation.

As shown in FIG. 7, a client 910 may be a stand-alone system, as may be of particular interest where the components being tested are highly confidential. Additionally, according to an aspect of an embodiment as shown in FIG. 8, a client 910 may be part of a networked environment.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIG. 5 do not necessarily imply a particular order or sequence of events, nor are they intended to exclude other possibilities. For example, the operations depicted at blocks 505 and 510, or 515, 520, and 525 may occur substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for gate level simulation of an integrated circuit design comprising:
   on a computer device having a processor configured to simulate the timing of the design:
   identifying a design block in the design that has a verified timing;
   creating a smart timing model of the identified design block, wherein the smart timing model includes (i) a timing delay for an internal gate of the identified design block that is adjusted to zero and (ii) preserved timing for a gate of the identified design block that interfaces with the design;
   replacing the design block with the smart timing model to generate a modified design;
   executing a static timing analysis for the modified design; and
   executing a gate level simulation for the modified design.

2. The method of claim 1, further comprising identifying an element in the design block for which timing should be preserved in the smart timing model.

3. The method of claim 2, wherein the identifying of the element in the design block comprises executing a script to evaluate the smart timing model.

4. The method of claim 2, wherein the identifying of the element in the design block occurs during execution of the static timing analysis.

5. The method of claim 1, further comprising identifying an element in the design block for which an interconnect delay should be added in the smart timing model.

6. The method of claim 1, wherein the smart timing model has an added interconnect delay for a gate subsequent to logic in a clock path.

7. The method of claim 1, wherein the smart timing model has an added interconnect delay for a gate in an asynchronous path.

8. The method of claim 1, wherein the smart timing model has timing preserved for gates in a combinational loop for an internally generated clock.

9. The method of claim 1, wherein the smart timing model has timing preserved for an internal gate in a multi-cycle path.

10. The method of claim 1, wherein the smart timing model has an added interconnect delay to correct a hold violation.

11. The method of claim 1, further comprising, if a timing violation is identified during the static timing analysis, adjusting the smart timing model to correct the identified violation.

12. The method of claim 1, wherein executing the static timing analysis is performed only for elements of the design that are impacted by the replacement of the design block.

13. The method of claim 1, further comprising correcting a timing violation identified during the static timing analysis.

14. The method of claim 1, further comprising generating a timing file for use during the gate level simulation.

15. A non-transitory computer readable medium storing instructions that when executed by a processor perform a method of simulating an integrated circuit design, the method comprising:
- identifying a design block in the design that has a verified timing;
- creating a smart timing model of the identified design block, wherein the smart timing model includes (i) a timing delay for an internal gate of the identified design block that is adjusted to zero and (ii) preserved timing for a gate of the identified design block that interfaces with the design;
- replacing the design block with the smart timing model to generate a modified design;
- executing a static timing analysis for the modified design; and
- executing a gate level simulation for the modified design.

16. The computer readable medium of claim 15, the method further comprising identifying an element in the design block for which timing should be preserved in the smart timing model.

17. The computer readable medium of claim 15, the method further comprising identifying an element in the design block for which an interconnect delay should be added in the smart timing model.

18. A system comprising:
- a memory to store an integrated circuit design; and
- a processor configured to simulate timing for the design by:
  - identifying a design block in the design that has a verified timing;
  - creating a smart timing model of the identified design block, wherein the smart timing model includes (i) a timing delay for an internal gate of the identified design block that is adjusted to zero and (ii) preserved timing for a gate of the identified design block that interfaces with the design;
  - replacing the design block with the smart timing model to generate a modified design;
  - executing a static timing analysis for the modified design; and
  - executing a gate level simulation for the modified design.

19. The method of claim 18, further comprising identifying an element in the design block for which timing should be preserved in the smart timing model.

20. The system of claim 18, further comprising identifying an element in the design block for which an interconnect delay should be added in the smart timing model.

* * * * *

UNITED STATES PATENT AND TRADEMARK OFFICE
CERTIFICATE OF CORRECTION

| | |
|---|---|
| PATENT NO. | : 9,710,579 B1 |
| APPLICATION NO. | : 14/094393 |
| DATED | : July 18, 2017 |
| INVENTOR(S) | : Gagandeep Singh et al. |

It is certified that error appears in the above-identified patent and that said Letters Patent is hereby corrected as shown below:

In the Claims

Column 10, Line 19, change "The method of" to --The system of--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*